United States Patent [19]
Hawkins

[11] 3,888,368
[45] June 10, 1975

[54] WRECKER ATTACHMENT

[76] Inventor: Wallace H. Hawkins, Rt. 7 Buncombe Rd., Greenville, S.C. 29609

[22] Filed: Sept. 6, 1973

[21] Appl. No.: 394,745

[52] U.S. Cl............ 214/86 A; 108/54; 248/23; 212/8 R
[51] Int. Cl............................................ B66c 23/44
[58] Field of Search........ 214/77 R, 86 A, 621, 515; 280/34 R, 34 T, 402; 248/23, 172; 212/8 R, 145, 17; 108/54

[56] References Cited
UNITED STATES PATENTS

| | | | |
|---|---|---|---|
| 2,873,934 | 2/1959 | Settles | 108/54 |
| 3,066,898 | 12/1962 | Haynes | 248/23 |
| 3,373,993 | 3/1968 | Oja et al. | 212/145 |
| 3,490,627 | 1/1970 | Goldston, Jr. | 214/86 A |

*Primary Examiner*—Robert J. Spar
*Assistant Examiner*—Lawrence J. Oresky
*Attorney, Agent, or Firm*—Bailey & Dority

[57] ABSTRACT

A wrecker attachment for mounting on the bed of a pickup truck and the like, including a base supporting member which has laterally spaced elongated telescoping legs which can be adjusted in length. Carried adjacent the ends of the legs are transverse tubular members which receive laterally extending telescoping extensions. Positioned on the base supporting member is a lifting and towing hoist. The telescoping extensions and elongated legs can be adjusted so as to be mounted on the frame of various size pickup trucks.

2 Claims, 3 Drawing Figures

PATENTED JUN 10 1975   3,888,368

WRECKER ATTACHMENT

BACKGROUND OF THE INVENTION

This invention relates generally to a wrecker attachment, and more particularly to a base supporting member which is adapted to be adjusted to be mounted on various size pickup trucks.

Normally, wreckers are mounted on specially designed trucks capable of transporting very heavy loads. While these wreckers operate satisfactorily, they are rather expensive and as a result, small garages and service stations cannot justify the cost since the majority of their business merely involves towing of automobiles to the service station and garage.

Generally, most garages and service stations have a pickup truck for use in connection with the business, and these trucks are of many different models and design. When it is desired to convert one of these pickup trucks into a wrecker, normally specially designed supporting bases have to be constructed for the particular truck, increasing the cost thereof.

Therefore, it can be seen that there is a definite need for a lightweight wrecker that can be readily mounted on the frame of the majority of makes of pickup trucks by merely removing the bolts which secure the bed of the truck to the frame of the vehicle and utilizing the same bolts for securing the wrecker attachment thereto.

SUMMARY OF THE INVENTION

The invention comprises a wrecker attachment for mounting on the bed of a pickup truck and the like. The attachment includes a base supporting member having a pair of laterally spaced elongated supporting members. Each of these elongated supporting members includes telescoping parts for varying the overall longitudinal length of the elongated supporting members. Transverse tubular members are carried adjacent opposite ends of the elongated supporting members. Laterally extending telescoping extensions project outwardly from the ends of the transverse tubular members and have brackets provided thereon. These brackets have holes therein adapted to receive the bolts which are commonly used for securing the bed of the pickup to the frame of the truck. A lifting and towing hoist is supported on the supporting member. Thus, the overall dimensions of the base supporting member can be adjusted so that the holes in the brackets carried thereby can be aligned for receiving the bolts used for securing the bed to the pickup truck.

Accordingly, it is a general object of the present invention to provide a wrecker attachment capable of being mounted on various size trucks.

A more specific object of the present invention is to provide a wrecker attachment capable of being mounted on various size trucks.

A more specific object of the present invention is to provide a wrecker attachment having a base supporting member that the overall dimensions thereof may be adjusted so that the device can be readily mounted on various size pickup trucks with a minimum of effort.

These and other objects and advantages of the invention will become apparent upon reference to the specification, attendant claims and drawing.

DESCRIPTION OF THE PREFERRED EMBODIMENT

Figure 1:
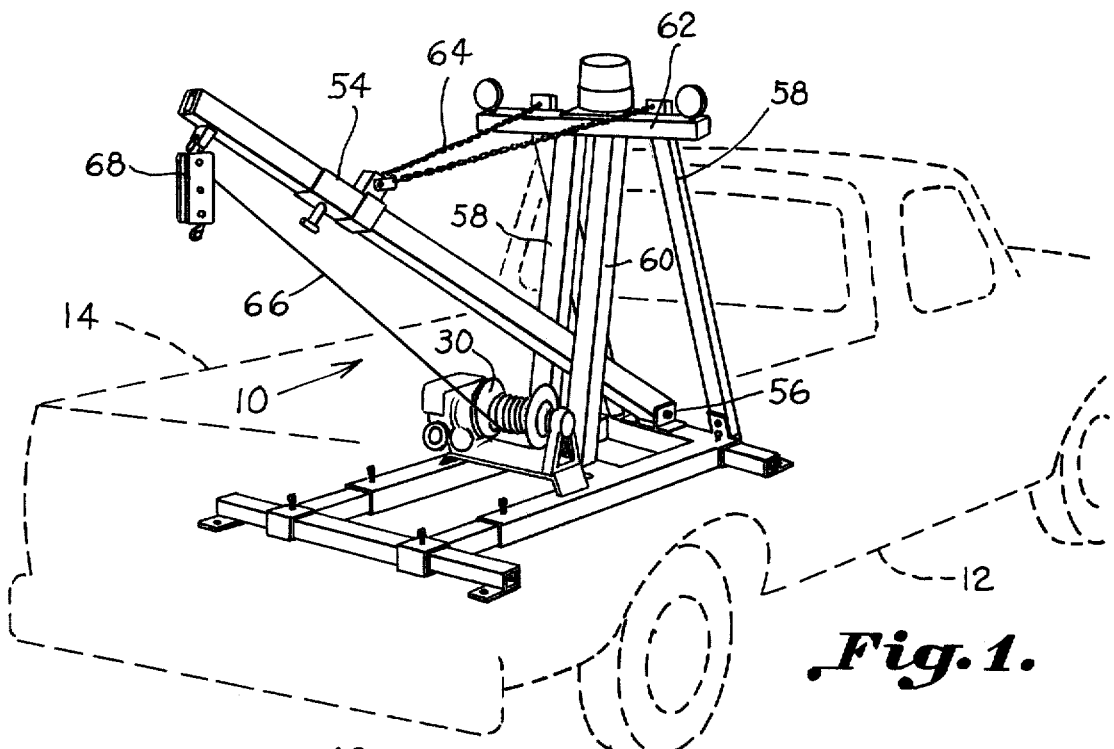
FIG. 1 is a perspective view of a wrecker attachment constructed in accordance with the present invention showing the position of such when mounted on a pickup truck.
Figure 3:
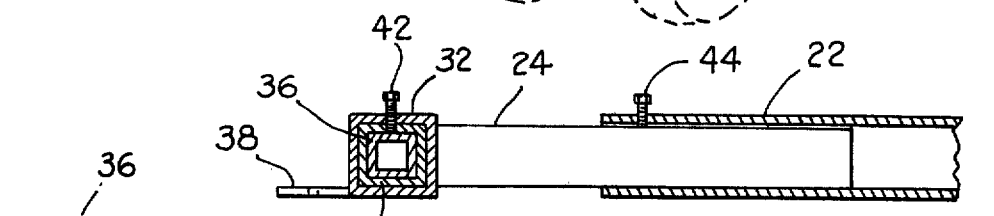
FIG. 3 is a sectional view taken along line 3—3 of FIG. 2.
Figure 2:
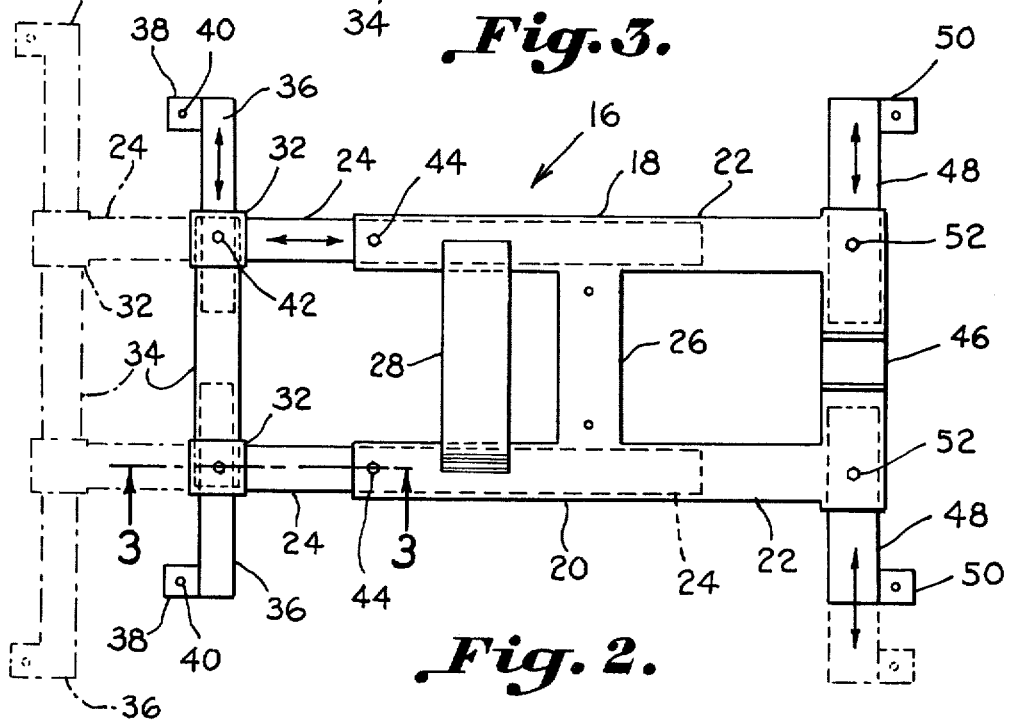
FIG. 2 is an enlarged plan view illustrating a base supporting member forming part of the wrecker attachment.

Referring to FIGS. 1 and 2, there is illustrated a wrecker attachment generally designated by the reference character 10 which is adapted to be mounted on the bed of a pickup truck 12 shown in phantom lines. It is desirable for simplifying the mounting of the wrecker attachment on the frame of the pickup truck to utilize the same bolts provided for securing the bed 14 of the pickup truck to the frame thereof (not shown). It is, also, desirable that the overall dimensions of a base supporting member 16 be adjustable so as to be readily aligned with the bolts used for securing the bed of the truck to the frame thereof. The base supporting member 16 includes a pair of laterally spaced elongated supporting members 18 and 20, each of which is constructed of a pair of elongated steel tubular members 22 and 24 which have a substantially square cross-section. The overall dimension of the tubular member 24 is less than the inside dimension of the channel tubular 22 so that such can slide in telescoping relation therewith. Cross-brace 26 extends between the elongated members 18 and 20 for adding strength thereto. Another cross-brace 28 is attached between the laterally spaced members 18 and 20 for providing a platform for supporting a power driven winch 30 forming part of the wrecker.

Relatively short transverse tubular members 32 are welded to the outer ends of the tubular members 24 for receiving another elongated tubular member 34 of slightly smaller dimensions. Laterally extending telescoping extensions 36, constructed also of steel tubing, extends within the tubular member 34 in telescoping relation therewith so that such can be shifted in and out thereof for adjusting the overall dimensions of the base supporting members. A bracket 38 having a hole 40 extending therethrough is welded to the outer ends of the tubular member 36 for accommodating bolts for securing the base supporting member to the frame of the truck. Normally, the same bolts used for connecting the bed of the truck to the frame are utilized for securing the brackets to the frame. As can be seen in FIG. 2, the longitudinal position of the elongated tubular members 24 may be adjusted from the full to the phantom line position to increase the overall length of the supporting members. The lateral position of the extension 36 can also be adjusted from the full to phantom line position in FIG. 2 to vary the width of the supporting member.

A threaded bolt 42 extends through a threaded hole in tubular member 32, an aligned hole in tubular member 34 to abut against an upper surface of tubular member 36 for locking the extensions 36 in position. Similar bolts 44 are threaded through holes in elongated tubular members 22 for abutting against upper surfaces of tubular members 24 for locking the elongated members together. Welded to the inner end of tubular member 22 is a transverse tubular member 46 which has laterally adjustable tubular extensions 48 projecting out the ends thereof. Brackets 50 are welded to the end of the tubular members 48 for receiving a bolt through a hole provided therein for mounting the inner end of the base supporting member to the frame of the truck. Threaded bolts 52 extend through the tubular member 46 and abuts against an upper surface of the tubular members 48 for locking the extensions 48 in position.

A conventional adjustment boom 54 is pivotally attached by means of a bracket 56 to the channel member 46 forming part of the base supporting member. Suitable upright standards 58 and 60 also extend upwardly from the base supporting member. A crossbrace 62 is welded to the upper end of the standards 58 and 60, and has chains 64 extending outwardly therefrom to the boom 54 for aiding in supporting the boom 54. The winch 30 has a coil of cable 66 extending outwardly therefrom through a block 68 for providing a lifting and towing hoist.

In summarizing the operation of the invention, any suitable lifting and towing hoist may be mounted on the base supporting member which is adapted to be adjusted so that such can be readily mounted in pickup trucks of various dimensions. The overall length of the base supporting member may be adjusted by loosening bolts 44 and sliding the telescoping members 24 in and out of the tubular members 22. The overall width of the base supporting member may be adjusted by manipulating bolts 42 and 52 for varying the position of extensions 36 and 48.

While a preferred embodiment of the invention has been described using specific terms, such description is for illustrative purposes only, and it is to be understood that changes and variations may be made without departing from the spirit or scope of the following claims.

What is claimed is:

1. A wrecker attachment for mounting on the frame of a pickup truck and the like comprising: a base supporting member having a pair of laterally spaced elongated supporting members, each of said elongated supporting members including interconnected telescoping parts for varying the overall longitudinal length of said elongated supporting members movable longitudinally in unison to so vary the length, forward and rearward transverse tubular members carried adjacent opposite ends of said elongated supporting members maintaining a fixed transverse spacing between said elongated supporting members forming a fixed base, at least four laterally extending telescoping, independently adjustable extensions projecting outwardly from ends of said transverse tubular members each exension independently laterally adjustable relative to said base and longitudinally adjustable in pairs, brackets carried by said telescoping extensions having holes therein adapted to receive bolts for securing said base supporting members, telescoping parts, transverse tubular members and telescoping extensions being disposed in substantially the same horizontal plane, and a lifting and towing hoist supported on said fixed base, said lifting and towing hoist having a boom pivoted on said forward transverse tubular member, a winch and cable, said cable being supported by an outer end of said boom for lifting heavy objects whereby said telescoping extensions and said telescoping parts forming said base supporting member can be adjusted so that said wrecker attachment can be mounted on various size trucks.

2. The wrecker attachment as set forth in claim 1 further comprising: bolts extending through said transverse channels for engaging said extensions to lock said extensions in position.

* * * * *